US012776138B2

(12) United States Patent
Nie

(10) Patent No.: US 12,776,138 B2
(45) Date of Patent: Oct. 27, 2026

(54) MULTIMEDIA DATA PROCESSING METHOD, DEVICE AND ELECTRONIC DEVICE

(71) Applicant: Lenovo (Beijing) Limited, Beijing (CN)

(72) Inventor: Zhipeng Nie, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 286 days.

(21) Appl. No.: 18/606,683

(22) Filed: Mar. 15, 2024

(65) Prior Publication Data

US 2024/0320967 A1 Sep. 26, 2024

(30) Foreign Application Priority Data

Mar. 22, 2023 (CN) ........................ 202310286313.7

(51) Int. Cl.
*G06V 10/94* (2022.01)
*G06T 3/40* (2006.01)
(Continued)

(52) U.S. Cl.
CPC .............. *G06V 10/955* (2022.01); *G06T 3/40* (2013.01); *G06V 20/46* (2022.01); *G06V 40/16* (2022.01); *G11B 27/34* (2013.01)

(58) Field of Classification Search
CPC ...... G06V 10/955; G06V 20/46; G06V 40/16; G06T 3/40; G11B 27/34;
(Continued)

(56) References Cited

U.S. PATENT DOCUMENTS

2007/0081587 A1* 4/2007 Raveendran ......... H04N 19/114 375/240.1
2018/0130496 A1* 5/2018 Mahapatra ............. G11B 27/28
(Continued)

FOREIGN PATENT DOCUMENTS

CN 112073649 A * 12/2020 ........... G11B 27/036

OTHER PUBLICATIONS

Bartolini et al, A general framework for real-time analysis of massive multimedia streams, 2018, Multimedia Systems (2018) 24: 391-406. (Year: 2018).*
(Continued)

*Primary Examiner* — Kathleen M Broughton
(74) *Attorney, Agent, or Firm* — ANOVA LAW GROUP, PLLC

(57) ABSTRACT

The application describes a multimedia data processing method, device, and electronic device. The method includes performing a first process on raw multimedia data based on target requirement information to obtain at least one to-be-processed multimedia data, where a data volume of each to-be-processed multimedia data is smaller than a volume of the raw multimedia data, performing a second processing on a corresponding to-be-processed multimedia data by using at least one processing algorithm to obtain a processing result for each to-be-processed multimedia data, where the at least one processing algorithm is related to the target requirement information, performing a target processing on the raw multimedia data based on the processing result for each to-be-processed multimedia data.

20 Claims, 3 Drawing Sheets

(51) Int. Cl.
*G06V 20/40* (2022.01)
*G06V 40/16* (2022.01)
*G11B 27/34* (2006.01)

(58) Field of Classification Search
CPC ......... H04N 21/234381; H04N 21/242; H04N 21/4302; H04N 21/440281; H04N 21/8547
See application file for complete search history.

(56) References Cited

U.S. PATENT DOCUMENTS

| | | | | |
|---|---|---|---|---|
| 2020/0302179 | A1* | 9/2020 | Gao | H04N 21/84 |
| 2022/0028427 | A1* | 1/2022 | Matsuda | H04N 5/2625 |
| 2022/0239882 | A1* | 7/2022 | Yang | G06V 20/46 |
| 2023/0144094 | A1* | 5/2023 | Wu | G06F 40/186 386/278 |

OTHER PUBLICATIONS

Kazanskiy et al, Performance analysis of real-time face detection system based on stream data mining frameworks, 2017, Procedia Engineering 201 (2017) 806-816. (Year: 2017).*

* cited by examiner

MULTIMEDIA DATA PROCESSING METHOD, DEVICE AND ELECTRONIC DEVICE

CROSS-REFERENCE TO RELATED APPLICATION

This application claims priority to Chinese Patent Application No. 202310286313.7, filed on Mar. 22, 2023, the content of which is incorporated herein by reference in its entirety.

TECHNICAL FIELD

The present disclosure generally relates to the field of computer technology and, more particularly, to a multimedia data processing method, device, and electronic device.

BACKGROUND

In the field of multimedia data technology, more and more application scenarios require high-quality multimedia data. Taking video data as an example, high-resolution video has become the mainstream video type in current video application scenarios. When processing high-resolution videos, there will be a large amount of calculation and delay, which cannot meet the video processing needs of application scenarios with strict real-time requirements such as live broadcasts or online video conferencing.

SUMMARY

In accordance with the present disclosure, there is provided a multimedia data processing method. The method includes performing a first processing on raw multimedia data based on target requirement information to obtain at least one to-be-processed multimedia data, where a data volume of each to-be-processed multimedia data is smaller than a data volume of the raw multimedia data; performing a second processing on a corresponding to-be-processed multimedia data by using at least one processing algorithm to obtain a processing result for each to-be-processed multimedia data, where the at least one processing algorithm is related to the target requirement information; and performing a target processing on the raw multimedia data based on the processing result for each to-be-processed multimedia data to obtain target multimedia data.

In accordance with the present disclosure, there is also provided a multimedia data processing device. The device includes a processor and a memory coupled to the processor, the memory storing instructions that, when executed by the processor, cause the processor to perform a first processing on raw multimedia data based on target requirement information to obtain at least one to-be-processed multimedia, where a data volume of each to-be-processed multimedia data is smaller than a data volume of the raw multimedia data; perform a second processing on a corresponding to-be-processed multimedia data by using at least one processing algorithm, and obtain a processing result for each to-be-processed multimedia data, where the at least one processing algorithm is related to the target requirement information; and perform a target processing on the raw multimedia data based on the processing result for each to-be-processed multimedia data to obtain target multimedia data.

In accordance with the present disclosure, there is also provided an electronic device. The device includes a slice creator, configured to perform a first processing on raw multimedia data based on target requirement information to obtain at least one to-be-processed multimedia data, where a data volume of each to-be-processed multimedia data is smaller than a data volume of the raw multimedia data; a combiner, configured to combine a processing result for each to-be-processed multimedia data obtained by performing a second processing on a corresponding to-be-processed multimedia data by using at least one processing algorithm, where the at least one processing algorithm is related to the target requirement information; and an encoder, configured to perform a target processing on the raw multimedia data based on the processing result for each to-be-processed multimedia data to obtain target multimedia data.

BRIEF DESCRIPTION OF THE DRAWINGS

In order to more clearly explain the technical solutions in the embodiments of the present disclosure or related technologies, the drawings consistent with the description of the embodiments will be briefly described hereinafter. Apparently, the drawings in the following description are merely for the embodiments of the present disclosure, those of ordinary skill in the art may also derive other drawings based on the provided drawings without exerting creative efforts.

DETAILED DESCRIPTION

The technical solutions in the embodiments of the present disclosure will be clearly described hereinafter with reference to the accompanying drawings in the embodiments of the present disclosure. Apparently, the described embodiments are merely partial rather than all of the embodiments of the present disclosure. Based on the embodiments in the present disclosure, all other embodiments obtained by those of ordinary skill in the art without creative efforts still fall within the scope of protection of the present disclosure.

It should be noted that the terms “first”, “second”, and so on in the description and claims of the present disclosure and the aforementioned drawings are used to distinguish similar objects and are not necessarily used to describe a specific order or sequence. It is to be noted that the data so used are interchangeable under appropriate circumstances so that the embodiments of the present disclosure may be practiced in sequences other than those illustrated or described herein. In addition, the terms “including” and “comprising” and any variations thereof are intended to cover non-exclusive inclusions. For example, for including a series of steps or units, they may include steps or units that are not explicitly listed or include steps or units inherent to processes, methods, products, devices, etc.

Figure 1:
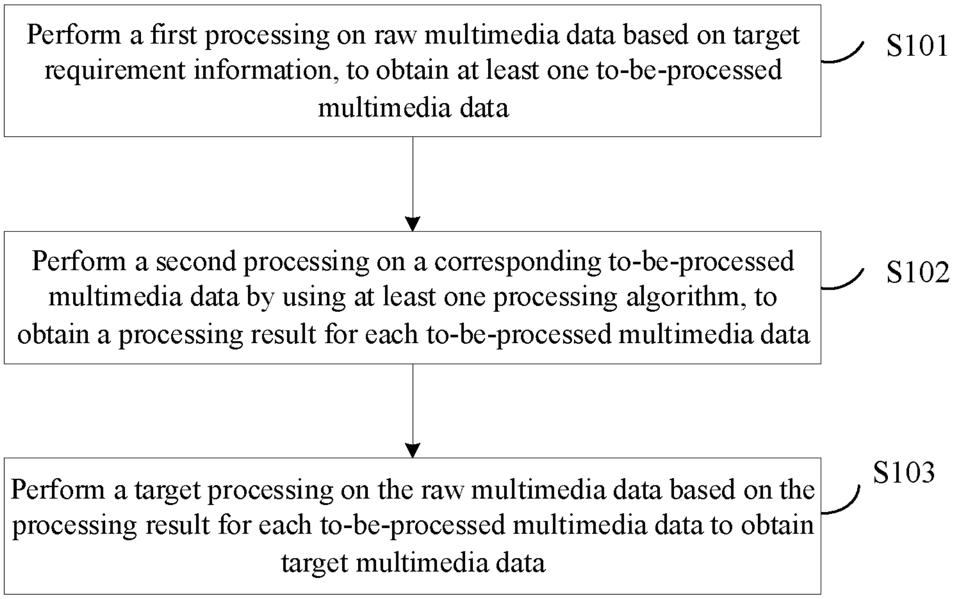
FIG. 1 is a flowchart of a multimedia data processing method, according to an embodiment of the present disclosure.

The embodiments of the present disclosure provide a multimedia data processing method, which may be executed by any electronic device, such as a client terminal or a server. The client terminal may be a smartphone, a tablet, a notebook computer, a desktop computer, etc. The server may be an independent physical server, a server cluster, a distributed system comprising multiple physical servers, or a cloud server that provides basic cloud computing services such as cloud services and cloud computing. Specifically, referring to FIG. 1, the method may include the following steps:

S101: Perform a first processing on raw multimedia data based on target requirement information, to obtain at least one to-be-processed multimedia data.

S102: Perform a second processing on a corresponding to-be-processed multimedia data by using at least one processing algorithm, to obtain a processing result for each to-be-processed multimedia data.

S103. Perform a target processing on the raw multimedia data based on the processing result for each to-be-processed multimedia data to obtain target multimedia data.

Here the raw multimedia data is multimedia data that needs to be processed. Multimedia data may include various types of data, such as graphics, images, audio, text, animation, and so on. Multimedia data may also include combined data in different forms, such as video data including images and audio.

The target requirement information is the processing requirement information for the instant raw multimedia data. Specifically, the target requirement information may be determined based on the scene characteristics of the application scenario for the raw multimedia data, the device specifications of a to-be-transmitted device, the data format features of the raw multimedia data, etc. Specifically, the target requirement information may include information identification requirements, labeling requirements, filtering requirements, data cropping, customized processing, scene switching, style or theme transformation, or it may include one or more of data format transformation, replacement of object(s) included in the data, adding audio or performing style transformation on audio, etc. In the following embodiments of the present disclosure, the multimedia data processing method will be described in detail with reference to different target requirement information, which will not be elaborated here. Further, in order to make full use of the computing resources of the processing system, in the embodiments of the present disclosure, the raw multimedia data may be first processed based on the target requirement information to obtain at least one to-be-processed multimedia data, where the volume of each of the at least one to-be-processed multimedia data is smaller than the volume of the raw multimedia data. The specific processing mode of the first processing may be determined based on the target requirement information. For example, the raw multimedia data is low-resolution image data containing multiple consecutive image frames, and the target requirement information may be a requirement for high-resolution image processing. At this moment, to be able to improve the resolution of the image and maximize the usage of processing resources, the multiple consecutive image frames of the raw multimedia data may be processed into a first number of to-be-processed frames through a sequential frame extraction process included in the first processing. Here, the first number is less than the total number of image frames of the consecutive multi-frame image. For another example, the raw multimedia data is video data, and the target requirement information may be a face recognition requirement. If face recognition is directly performed on each video frame in the video data, it will increase the consumption of computing resources. Accordingly, through a first processing that includes extracting frames according to object content, video frames including human are first extracted from the video data. Face recognition of a specified person is then performed on the extracted video frames. Specifically, the first processing may also include one or more of slicing by image area, frame extraction by time, frame extraction by sequence, frame extraction by object content, downsampling, partial content extraction, etc.

The raw multimedia data is first processed according to the target requirement information, and the raw multimedia data may be extracted, segmented, sliced, and so on based on different requirements, so that the data volume of the obtained at least one to-be-processed multimedia data is smaller than the volume of the raw multimedia data. This facilitates the subsequent processing and reduces the consumption of computing resources.

Further, in order to process efficiently and accurately, the at least one to-be-processed multimedia data may be respectively processed through a corresponding processing algorithm. For example, different to-be-processed multimedia data may be processed in parallel through different algorithms to improve the processing efficiency.

Specifically, second processing may be performed on a corresponding to-be-processed multimedia data by using at least one processing algorithm to obtain a processing result for each to-be-processed multimedia data. Here, the at least one processing algorithm is related to the target requirement information. Specifically, the processing algorithm may be related to the target requirement information. The processing algorithm may totally meet the target requirement information, or the processing algorithm needs to be combined with other general algorithms to meet the target requirement. If the target requirement information is a recognition requirement, the corresponding processing algorithm may be an object recognition algorithm. Specifically, the processing algorithm may be a face recognition machine model, a physical recognition machine model, and the like. If the target requirement information is a target object's voice recognition requirement or a requirement for converting audio to text, the corresponding processing algorithm may be a voiceprint recognition algorithm. If the target requirement information is a feature identification requirement, the corresponding processing algorithm may include a feature tag-adding algorithm. If the target requirement information is a requirement to improve image quality, the corresponding processing algorithm may include image enhancement, noise reduction, and the like. If the target requirement information is personalization processing, the corresponding processing algorithm may include a special effects-adding algorithm, audio voice changing processing, etc. After obtaining the at least one to-be-processed multimedia data, the processing algorithm corresponding to each to-be-processed multimedia data may be determined among a plurality of processing algorithms, so that the computing resources in the processing system may be fully utilized and the corresponding processing algorithms may be intelligently scheduled. Furthermore, parallel processing may be executed to improve processing efficiency.

After performing the second processing on a corresponding to-be-processed multimedia data through the at least one processing algorithm, a processing result corresponding to each to-be-processed multimedia data may be obtained. Then target processing is performed on the raw multimedia data based on the processing result for each to-be-processed multimedia data to obtain target multimedia data.

In the process of target processing the raw multimedia data based on the processing results, it is necessary to determine the target processing method for the raw multimedia data based on each processing result, so that the obtained target multimedia data may meet the target requirement information. Specifically, if the target requirement information is face recognition, the first processing may extract the image area including human in each image, and the second processing may be to perform face recognition processing on the image area including human. The processing result may be the area coordinate information of the human face. A face recognition frame may be then generated based on the area coordinate information of the human face. Based on the position information of the area coordinate information of the human face in the image area including human, a corresponding human face recognition frame may be tracked back to the corresponding image frame in the raw multimedia data, so that the obtained target multimedia data is the multimedia data including the face recognition frame. That is, a face recognition frame may be added to the corresponding image frame including the human face. If the target requirement information is a requirement to improve the image resolution, several image frames may be obtained through the first processing. The second processing may be then performed based on an algorithm(s) for improving the image resolution. By using multiple processing algorithms to improve the image resolution, groups of image frames are processed in parallel to obtain multiple groups of high-resolution image frames. These high-resolution image frames are then merged according to the sequence of the image frames in the raw multimedia data to obtain the target multimedia data. Optionally, additional rendering and other operations may be further performed before obtaining the target multimedia data. It should be noted that when obtaining the target multimedia data, the global timestamp information is mapped based on the data stream of the raw multimedia data. The mapped timestamp information may be applied in the first processing process to determine the timestamp information of the to-be-processed multimedia data. The mapped timestamp information may also be applied in the target processing process to determine the timestamp information of the data frame of the target multimedia data, thereby ensuring global timeline alignment, and ensuring the accuracy of the eventually obtained target multimedia data.

In the embodiments of the present disclosure, the computing resources of the processing system may be used to intelligently schedule the corresponding processing algorithms in the process of processing the data through the at least one processing algorithm. This may allow parallel operations, reduce sequential delays, and reduce the computing power overhead of the multimedia data processing resources and processing algorithms, thereby improving the data processing efficiency.

The execution method included in steps S101 to S103 is described in detail hereinafter with specific implementation methods and/or application scenarios.

In one implementation of the embodiments of the present disclosure, the multimedia data processing method further includes at least one of the following:

Obtain first timestamp information of the raw multimedia data, and use the first timestamp information to align a to-be-processed multimedia data, the corresponding processing results, and the corresponding data frame of the raw multimedia data.

Determine availability of the processing result based on at least second timestamp information, so as to determine, based on the availability of the processing result, whether or not to perform the target processing of the raw multimedia data based on the processing result. Here, the second timestamp may indicate the time point when a processing result is generated.

The raw multimedia data may include at least one data frame, and the first timestamp information may be time information when each data frame is obtained. For example, the raw multimedia data is video data, which may include multiple consecutive video frames, and the first timestamp information may be the time when the video data stream is received, that is, the time corresponding to the data stream timing. Aligning the corresponding data frames of the to-be-processed multimedia data, the processing result and the raw multimedia data through the first timestamp information may ensure global timeline alignment. For example, according to the first timestamp information, the raw multimedia data may be sequentially extracted and processed in the temporal order of obtaining each data frame in the raw multimedia data to obtain at least one to-be-processed multimedia data. After obtaining the processing result, the processing result is input, according to the temporal order, to the processor that performs the target processing, so that the corresponding data frame of the raw multimedia data may be processed based on the processing result to obtain the target multimedia data to meet actual application requirements.

Further, in order to reduce the sequential delay in the data processing process, the availability of a processing result may be determined based on at least the second timestamp information, where the second timestamp information indicates the time point when the processing result is generated. In one implementation, determining the availability of the processing result based on at least the second timestamp information includes: use the first timestamp information of the raw multimedia data to mark each frame of the to-be-processed multimedia data; use the second timestamp information to mark the processing result of each frame of the to-be-processed multimedia data; if it is determined, based on the second timestamp information and the first timestamp information, that the processing time of a first multimedia data frame is not greater than the first threshold, perform a target processing on the raw multimedia data based on the processing result of the first multimedia data frame; if it is determined, based on the second timestamp information and the first timestamp information, that the processing time length of the first multimedia data frame is greater than the first threshold, discard the processing result of the first multimedia data frame.

The first timestamp information is the time corresponding to the data stream timing of the raw multimedia data, and the second timestamp information indicates the actual time point for each frame when the processing of each frame of to-be-processed multimedia data is completed. If, before processing the first multimedia data frame in the to-be-processed multimedia data, the timing of the first multimedia data frame is marked as the first time point by the first timestamp information, and if the moment when the processing of the first multimedia data frame is completed is marked as the second time point by the second timestamp information, the difference between the second time point and the first time point is determined as the processing time length of the first multimedia data frame. Then, through the target requirement information, the application scenario after the processing of the raw multimedia data may be determined. If it is for online processing of real-time data streams, if the processing time is long, it may affect the reception effect of the receiving terminal, such as video stream lags, etc. At this moment, the first threshold may be determined based on the actual target requirement information. If the processing time length of the first multimedia data frame is not greater than the first threshold, it means that the current processing does not affect the actual application effect of the multimedia data. Target processing may be then performed on the raw multimedia data based on the processing result of the first multimedia data frame. If the processing time length is greater than the first threshold, it means that the current processing will affect the application of the target multimedia data. In order to ensure the smooth transmission and processing efficiency of the eventual target multimedia data, the processing result of the first multimedia data frame may be discarded.

In order to improve the processing efficiency of multimedia data, in the embodiments of the present disclosure, the raw multimedia data may be first processed based on the target requirement information, so that the data volume of the at least one to-be-processed multimedia data is smaller than the data volume of the raw multimedia data. Accordingly, a smaller volume of to-be-processed multimedia data may be processed, resulting in fewer computing resources to be occupied. Specifically, performing a first processing on the raw multimedia data based on the target requirement information includes at least one of the following:

(1) Identify at least one target data frame set from the raw multimedia data based on the target requirement information, and take the at least one target data frame set as the at least one to-be-processed multimedia data.

Here, at least a temporal correlation exists between data frames within each of the at least one target data frame set. When identifying a target data frame set from the raw multimedia data based on the target requirement information, the identification may be conducted based on time or the interval data of the data frames. For example, if the target requirement information is to block a specified person, then, from the raw multimedia data, a set of data frames including the specified person may be identified as the to-be-processed multimedia data based on the time when the person shows up in the row multimedia data. For another example, if the target requirement information is to add special effects to a video stream, usually different special effects are added in specified video intervals. At this moment, at least one set of target data frames may be identified as the to-be-processed multimedia data according to the specified interval. Corresponding special effects are then added to the to-be-processed multimedia data.

(2) Perform a downsampling processing on target data frames of the raw multimedia data based on the target requirement information, to obtain the at least one to-be-processed multimedia data.

The number of target data frames is not greater than the total number of data frames in the raw multimedia data, and the resolution of each target data frame is smaller than the resolution of the corresponding data frame in the raw multimedia data. Downsampling may also be called decimation, the essence of which is to downsize an image and reduce the number of sampling points in the matrix. Using downsampling in the image processing process may reduce the amount of video memory and calculations. That is, the smaller the image, the less memory it will occupy and the amount of calculation will be less. The number of target data frames for the downsampling process may be determined based on the target requirement information. The target data frames may include all data frames of the raw multimedia data, or may include partial data frames of the raw multimedia data. For example, if the target requirement information is to identify human in image, it is merely necessary to obtain each image frame including human in the raw multimedia data, without necessarily identifying who a person specifically is. Downsampling may be then performed on each data frame in the raw multimedia data, to reduce memory usage during image recognition. For another example, if the target requirement information is an image style change requirement, the part of image frames of the raw multimedia data that do not need to be changed in image style may be downsampled, so that even if the resolution of this part of the image frames is reduced, the image style change will not be affected. The processing also reduces the computing resources of the overall image processing.

(3) Sample target content of the raw multimedia data based on the target requirement information to obtain at least one target data frame set, and take the at least one target data frame set as the at least one to-be-processed multimedia data.

Here, a content-associated relationship exists between data frames within each of the at least one target data frame set. Based on the specified content included in the target requirement information, in the process of sampling the target content of the raw multimedia data, merely specified content may be selected for sampling. For example, the specified content may include a specified object and/or a specified voiceprint. Here, the specified object may refer to a specified person, such as Person A, or a specified item, such as a whiteboard or PowerPoint slides for presentation in a conference video. The specified voiceprint may refer to an object with a specified audio frequency, such as data frames including background music, or the specified voiceprint may be an object with a specified timbre, such as an object with the timbre characteristics of a child's voice. Correspondingly, the target content may also refer to content that continuously changes. In one example, the target requirement information is to add a specific filter to the scene-associated information. At this moment, the target data frame set corresponding to the target content includes multiple consecutive frames that exhibit the scene. Accordingly, in the embodiments disclosed herein, each data frame in each target data frame set at least has an association relationship in content, which may refer to an association relationship that indicates content matching, for example, each data frame in the target data frame set includes a same person or object. The association relationship in content may also refer to certain continuity of data frames, such as data frames that may restore the characteristics of a certain scene or the characteristics of an event, such as data frames that may represent the characteristics of a scene. The association relationship in content may also refer to data frames that indicate a person entering a certain place, or audio data frames that indicate a person's speech in audio data.

In the above embodiments of performing the first processing on the raw multimedia data based on the target requirement information, the timing, resolution, and content aspects are respectively explained. In practical applications, the raw multimedia data may also be conducted for the first processing in a variety of different ways. For example, if the target requirement information is to add occlusion to the face of a specified person, data frames within a time period that corresponds to the time period when the person shows up may be first extracted. Since only the face needs to be blocked, the images of the face area may be further extracted, and downsampling is performed on image frames that do not include the person or image areas that do not include the face part of the person, so as to reduce the consumption of image storage resources.

In the embodiments of the present disclosure, by extracting the to-be-processed multimedia data from the raw multimedia data, the process of obtaining the to-be-processed multimedia data may be performed according to different time intervals, frame intervals, or according to the content of the corresponding data frames, or it may be downsampled to different resolutions for further processing. This may reduce the computing power overhead of data processing and algorithms, and improve the efficiency of data processing. Further, in view of the technology of artificial intelligence, after obtaining the target requirement information, data extraction features corresponding to the target requirement information and the raw multimedia data may be input into a pre-configured data slicing model to obtain the at least one to-be-processed multimedia data. Here, the data slicing model is obtained by training a machine learning algorithm through first training data, which includes first historical multimedia data and historical extraction features used to extract the first historical multimedia data.

Specifically, if the extraction features include interval features, the extraction features may specifically include time interval features or data frame number interval features. Based on the interval features, the data frames corresponding to the raw multimedia data may be extracted to obtain the at least one to-be-processed multimedia data. Each to-be-processed multimedia data includes at least one data frame. If the extraction features include image area features, each data frame of the raw multimedia data may be divided into several image areas based on the image area features to obtain image area data corresponding to each data frame. Based on the image processing algorithm configured for the image area features, the image area data matching the image area features is processed to obtain an image area processing result corresponding to the image area data. Further, the image area processing result may include coordinate information identifying the image area. In another embodiment, if the extraction features include a resolution feature, at least one resolution parameter may be determined based on the resolution feature. To-be-processed multimedia is then generated for each data frame of the raw multimedia data corresponding to each resolution parameter. Based on the processing algorithm corresponding to each resolution parameter, the to-be-processed multimedia data corresponding to the resolution parameter is processed to obtain the processing result.

In order to accurately process the raw multimedia data, in the embodiments of the present disclosure, it is necessary to obtain a to-be-processed multimedia data corresponding to the raw multimedia data according to the target requirement information, and to perform the to-be-processed multimedia data by using at least one processing algorithm related to the target requirement information. Target processing is then performed on the raw multimedia data based on the processing result. The target multimedia data that meets the target requirement information may eventually be obtained. In the embodiments of the present disclosure, the target requirement information may be obtained through at least one of the following methods:

(1) Obtain target requirement information based on information input by a target user acting on an input component of an electronic device.

The electronic device may be an electronic device that executes the multimedia data processing method, or may be a client terminal that interacts with a server that executes the multimedia data processing method. Correspondingly, the input components of the electronic device may include a keyboard, a mouse, a voice interaction component, a gesture recognition component, a touch component, a face recognition component, etc. Specifically, the information input by the user acting on the input component of the electronic device may include information, input through a keyboard, that directly indicates the processing requirements, such as the inputted "human detection", or may be a selected operation through the functional area of the electronic device display interface. For example, if a button for adding background music is selected, the target requirement information is to add background music to the raw multimedia data. The target requirement information may also be determined based on the information input by the user when operating the sample information. For example, the user's operation may include adding special effects to a sampled picture. Following the operation, the type of special effects added by the user, the location of special effects to be added, etc., may be then determined. All of this information may be determined to be the target requirement information for adding special effects.

(2) Obtain the target requirement information based on interaction data between an electronic device and a receiving terminal of the target multimedia data.

The electronic device may be a device that executes the multimedia data processing method. The interaction data between the electronic device and the receiving terminal of the target multimedia data may be the interaction data when the electronic device and the receiving terminal are connected, such as the network configuration information when setting the network connection between the electronic device and the receiving terminal. The target requirement information may be then determined based on the relevant specifications of the network that may be used to transmit data between the electronic device and the receiving terminal. For example, when the network bandwidth is low, the corresponding target requirement information may include the requirement to reduce network transmission delay. Accordingly, when processing the raw multimedia data, it requires considering the resolution of the corresponding data frames. The interaction data may also obtain the requirements of the remote receiving terminal of the target multimedia data. For example, if the receiving terminal is a high-definition display device and the target multimedia data is a high-definition video stream, the user experience will be better. At this moment, the corresponding target requirements may include information that improves the clarity of the video.

(3) Obtain the target requirement information based on application scenario information of the target multimedia data.

The application scenario information of the target multimedia data may include the application purpose information of the target multimedia data, such as a scenario that requires the target multimedia data to be displayed. For example, if the target multimedia data needs to be displayed in high definition, the target requirement information may include the requirement to improve the clarity of the multimedia data. For another example, if the target multimedia data needs to be applied in a scenario of tracking a specified object, then the target requirement information may include information for identifying the specified object. The application scenario information may also be determined based on the receiving entity and the application approach of the application scenario, which is then used to determine the target requirement information. If the target multimedia data needs to be displayed to lower-grade students, in order to help them understand the content better, the corresponding spelling may be added with pronunciation while adding subtitles. At this moment, the target requirement information includes the requirement to add spelling with pronunciation. For another example, if the target multimedia data is used by disseminating it on a public platform, in order to protect the privacy of the relevant person, blocking effects may be added to a specified person. Accordingly, the target requirement information includes the requirement to add blocking effects to the specified person.

(4) Obtain the target requirement information based on configuration information of the receiving terminal of the target multimedia data.

The target requirement information may be obtained based on the hardware configuration information or software configuration information of the receiving terminal of the target multimedia data. The hardware configuration information may include the configuration information of the display hardware, the configuration information of the audio output hardware, the configuration information of the transmission hardware, etc. For example, the configuration information of the display hardware includes a specification regarding the highest resolution of the data that the display hardware is able to display. If the resolution of the multimedia data is too high, the data may not be displayed, or may not be normally displayed. Accordingly, the resolution requirement information included in the target requirement information may be determined based on the specification regarding the highest resolution. Software configuration information may include permission configuration information, decryption configuration information, etc. If the receiving terminal cannot decrypt data, the target requirement information may include the requirement to receive unencrypted data. At this moment, when the electronic device processes the raw multimedia data, the electronic device must complete the decryption process in advance. In other words, the eventual target multimedia data is unencrypted data. By determining the target requirement information through the configuration information of the receiving terminal of the target multimedia data, the problem that the receiving terminal cannot perform the corresponding processing or cannot output the data after receiving the target multimedia data may be avoided.

It should be noted that the above methods are merely some examples of how the target requirement information may be determined. The target requirement information may also be determined through other different means. Furthermore, the target requirement information may also include a set of sub-requirement information. The above-described various methods may be used to determine the corresponding sub-requirement information respectively, which may be then combined to obtain the target requirement information.

Specifically, in the embodiments of the present disclosure, performing a second processing on a corresponding to-be-processed multimedia data by using at least one processing algorithm includes: determining a processing algorithm corresponding to each to-be-processed multimedia data based on the target requirement information; and performing a parallel processing on each to-be-processed multimedia data by using the corresponding processing algorithm to obtain at least one processing result; and processing the at least one processing result into processing parameters for the raw multimedia data.

When determining the corresponding processing algorithm based on the target requirement information, if the target requirement information includes multiple sub-requirements, each processing algorithm may correspond to one sub-requirement, or one processing algorithm may correspond to multiple sub-requirements. If the target requirement information includes only one processing requirement, one processing algorithm may be used to execute the processing requirement, and another processing algorithm may perform image processing other than the processing requirement. Specifically, at least one processing algorithm may be flexibly determined based on actual target requirement information. After the processing algorithms are determined, the to-be-processed multimedia data may be processed in parallel based on these processing algorithms. For example, if a video stream requires recognition of a target object, the video stream may be divided into a certain number of video frames to obtain the to-be-processed video frames. Each group of to-be-processed video frames includes a certain number of video frames. Each group of to-be-processed video frames is configured with a recognition algorithm, so that these recognition algorithms are processed in parallel, reducing the sequential delay in sequential execution.

After parallel processing of each to-be-processed multimedia data based on the corresponding processing algorithm, the processing result corresponding to each to-be-processed multimedia data is obtained. The processing result maps the target requirement information. If the target requirement information is object recognition, the processing result is the position information of the recognized object. In another example, if the target requirement information is to improve the clarity of a person, the processing result then is the pixel parameters of the corresponding person. The at least one processing result is further processed into processing parameters for the raw multimedia data, where the processing parameters may represent parameters that track back the corresponding processing result to the raw multimedia data, or may also be parameters that make the raw multimedia data conform to the processing result. For example, if the target requirement information is face recognition, the processing result may be the position information of the face area. If the recognized face is to be reflected in the raw multimedia data, the position information in a corresponding image frame in the raw multimedia data needs to be determined based on the position information of the face area. A recognition frame is then generated, and the recognition frame is displayed on the corresponding image frame. For another example, the target requirement information is to improve the display clarity of a person, and the processing result may be the pixel parameters for the person. In order to better match the scene around the person in the raw multimedia data, the processing parameters may be target pixel parameters determined based on the pixel parameters of the person. The target pixel parameters may not only improve the clarity of the person, but also better match the pixel parameters of the portions surrounding the person, resulting in an improved viewer experience.

Further, performing a target processing on the raw multimedia data based on the processing result includes: performing the target processing on the raw multimedia data based on the processing parameters corresponding to each processing result, to obtain the target multimedia data. Here, the target processing includes at least one of the following: cropping, content replacement, annotation, scaling, parameter adjustment, special effects processing, encoding, and rendering. Cropping is mainly used to process the image of a single layer (such as deleting unnecessary parts) so that it may be imported into other images. The processing result may be used to determine the layer that needs to be cropped. The determined layer is then imported into the corresponding image in the raw multimedia data. Content replacement refers to replacing the corresponding content in the raw multimedia data based on the processing result. Parameter adjustment may include adjustment of display parameters and/or sound parameters in the multimedia data. For example, resolution adjustment of relevant images in the raw multimedia data may be performed based on the display resolution parameters included in the processing result. For another example, based on the volume adjustment parameters for specific data frames of the multimedia data included in the processing result, the volume of these specific data frames in the raw multimedia data may be adjusted to obtain the target multimedia data. Special effects processing may be to add special effects to a corresponding data frame or to a specified object. For example, the processing result indicates the location information of the object for adding special effects. The location information of the object may be used to determine the location of the object in the raw multimedia data. Corresponding special effects are then added to the location to obtain the target multimedia data. Encoding or rendering may be performed based on the encoding parameters or rendering parameters in the processing result, to complete the encoding or rendering of images in the raw multimedia data to obtain the target multimedia data.

In order to enable the multimedia data processing method to meet the processing requirements of multimedia data and the application requirements of application scenarios in real time, the embodiments of the present disclosure also include at least one of the following: updating the at least one processing algorithm based on changing information of the target requirement information; performing a corresponding first processing by at least one electronic device in a processing system, the processing system including a plurality of electronic devices capable of executing the multimedia data processing method; and performing a corresponding second processing using a corresponding processing algorithm by at least one electronic device in the processing system, the processing system including a plurality of electronic devices capable of executing the multimedia data processing method.

In the actual application process of multimedia data processing, a user may adjust the processing requirements for multimedia data based on the real-time processing result. For example, based on the processing result of an image, it may be further determined whether it is necessary to adjust the color contrast of the image. If it is necessary, a processing algorithm capable of chroma processing is added. For another example, after a target object is recognized, there is no need to continue object recognition on subsequent data, then the object recognition algorithm may be deleted.

In the embodiments of the present disclosure, the multimedia data processing method may be executed through a processing system, where the processing system may include a plurality of electronic devices capable of executing the multimedia data processing method, and the corresponding processes in the multimedia data processing method are executed through the electronic devices. The corresponding first processing may be performed by at least one electronic device in the processing system. The first processing is to process the raw multimedia data based on the target requirement information to obtain at least one to-be-processed multimedia data. Accordingly, if the target requirement information includes different requirement specifications, the corresponding first processing may be performed by using different electronic devices. For example, a first electronic device in the processing system performs a processing of creating low-resolution to-be-processed multimedia data, and a second electronic device performs a processing of creating to-be-processed multimedia data including a plurality of image feature areas. Correspondingly, the corresponding second processing may also be performed by at least one electronic device with a corresponding processing algorithm in the processing system. For example, a first electronic device performs an object recognition processing by using an object recognition algorithm, and a second electronic device performs an image enhancement processing using an image enhancement algorithm, a third electronic device performs a processing of converting audio into text using an audio-to-text algorithm, and so on. In the embodiments of the present disclosure, the processing system may be a distributed processing system. A distributed system may include a plurality of electronic devices connected through a communication network, where these devices may be in different locations, have different functions, or own different data. These devices may coordinately complete large-scale data processing tasks under the same management control by a control device. Accordingly, different processing procedures may be assigned to different electronic devices within the distributed processing system. For example, a processing flow corresponding to the first processing is assigned to a first electronic device for execution, and at least one second electronic device performs a corresponding processing algorithm, and a third electronic device performs the target processing. This may improve processing efficiency.

Figure 2:
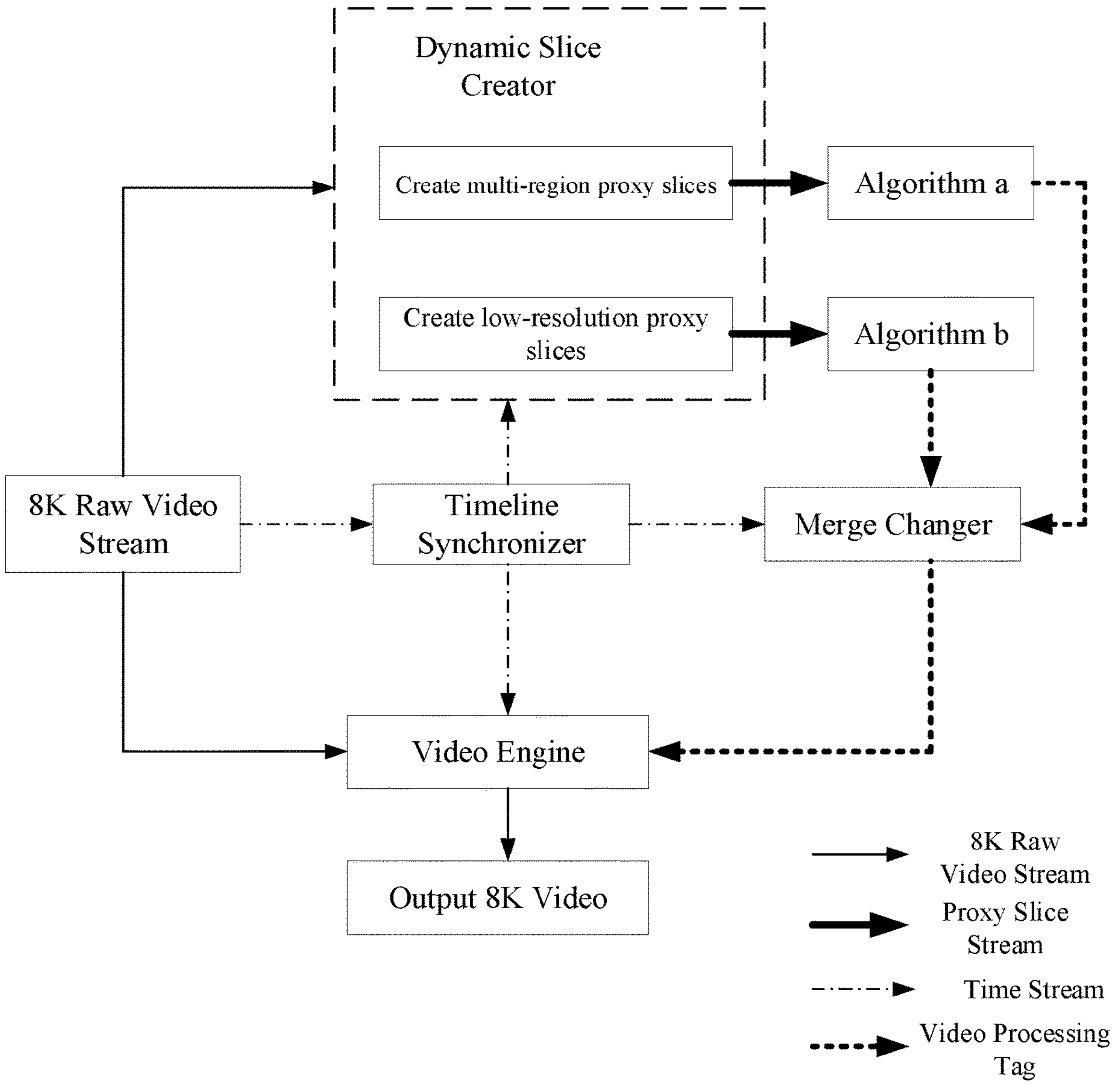
FIG. 2 is a schematic diagram of an ultra-high-definition resolution video processing architecture applicable for real-time application scenarios, according to an embodiment of the present disclosure.

The multimedia data processing method in the embodiments of the present disclosure will be described hereinafter with reference to a specific application scenario. The application scenario corresponds to a scenario of ultra-high-resolution video processing. Specifically, the application scenario may be a processing of an 8K video stream. FIG. 2 is a schematic diagram of an ultra-high-resolution video processing architecture applicable for real-time scenarios, according to an embodiment of the present disclosure. If the 8K video stream is directly processed, it will cause a relatively large amount of calculation and potential delay, which may not meet the application requirements of live streaming or video conferencing scenarios where 8K video streams are used.

In the embodiments of the present disclosure, a number of low-resolution downsampling proxy slices (a proxy slice represents at least one video frame or a part of an image area in a certain video frame) may be created for the 8K video stream in real-time. According to the application requirements of the 8K video stream, proxy slices may be dynamically generated for videos in different temporal and spatial domains, and then these proxy slices may be processed. The raw 8K data stream may be processed based on the processing results, to obtain the high-definition video that is proper for output.

FIG. 2 includes a dynamic slice creator, a timeline synchronizer, a merge changer, a video engine, etc. The dynamic slice creator is configured to create proxy slices, and the timeline synchronizer is configured to perform the global time synchronization. The merge changer is configured to process the raw 8K video stream based on the processing results of different processing algorithms. The video engine is configured to encode, render, and perform other processing on the video to obtain a to-be-output 8K video stream. In FIG. 2, the 8K raw video stream is the input raw video stream, and the output 8K video is the video stream output in real-time after the processing is completed. Assume that the entire processing process includes algorithm a and algorithm b that process the video at the same time. The specific process is further described in the following.

The input 8K raw video stream is first input to the dynamic slice creator. Corresponding video slices are dynamically created based on the actual requirement information of the application scenario, such as the specific available processing algorithms in the current processing architecture. Video slices may be created according to different time intervals, video frame intervals, and different picture areas, and may also be downsampled to different resolutions. After the slices are created, the slices are assigned to the corresponding algorithm(s). For example, some of the created multi-region proxy slices are extracted image frames including people, and these image frames are input into algorithm b, which may be a face recognition algorithm. Created low-resolution proxy slices may be input into algorithm a, which may be an image enhancement processing algorithm. Algorithm a and algorithm b may be executed in parallel and synchronously. After the processing is completed, the processing results are input to the merge changer. The processing results include the corresponding processing tags. For example, the processing tag corresponding to the processing result of algorithm b is face recognition coordinate information, and the processing tag corresponding to the processing result of algorithm a is image enhancement parameter data. The timeline synchronizer will match the global timestamp based on the 8K raw video stream, which is then output to the dynamic slice creator, merge changer, and video engine for reference, to ensure global timeline alignment. The change combiner receives the video processing tags of all algorithms, and converts the tags into corresponding information for passing to the video engine. For example, the face recognition coordinate information is converted into the coordinates of the image position that a face recognition frame will eventually display, the image enhancement parameter data is converted into actions for performing RGB value processing on certain locations, and so on. The video engine renders and encodes the corresponding images for the 8K raw video stream according to the parameters or actions provided by the change combiner, and outputs the 8K video.

Through the processing architecture provided by the embodiments of the present disclosure, the computing power resources in the system may be fully utilized, intelligent scheduling may be performed, and parallel operations of several processing algorithms may be conducted at the same time, thereby reducing the sequential delay. The method also reduces the computing power overhead of video processing and processing algorithms, and lowers the bar for specific applications. The method may also flexibly modify slicing and adjust processing algorithms based on actual application requirements, and may be easy to scale up.

Figure 3:
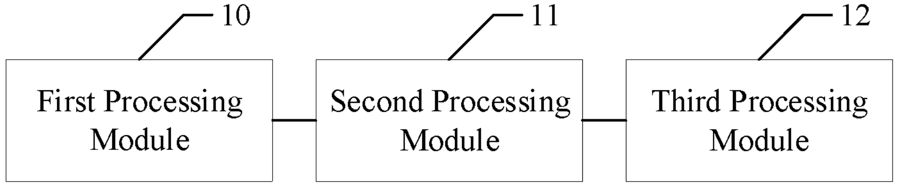
FIG. 3 is a schematic structural diagram of a multimedia data processing device, according to an embodiment of the present disclosure.

Embodiments of the present disclosure also provide a multimedia data processing device. Referring to FIG. 3, the device may include a first processing module 10 configured to perform a first processing on raw multimedia data based on target requirement information to obtain at least one to-be-processed multimedia data, where a data volume of each to-be-processed multimedia data is smaller than a data volume of the raw multimedia data; a second processing module 11 configured to perform a second processing on a corresponding to-be-processed multimedia data by using at least one processing algorithm, and obtain a processing result for each to-be-processed multimedia data, where the at least one processing algorithm is related to the target requirement information; and a third processing module 12 configured to perform a target processing on the raw multimedia data based on the processing for each to-be-processed multimedia data to obtain target multimedia data.

In one embodiment, the device further includes at least one of the following: a time alignment module configured to obtain first timestamp information of the raw multimedia data, and use the first timestamp information to align each to-be-processed multimedia data, the processing result for each to-be-processed multimedia data, and the corresponding data frame of the raw multimedia data; and a first determining module configured to determine availability of the processing result for each to-be-processed multimedia data based on at least second timestamp information, and determine, based on the availability of the processing result for each to-be-processed multimedia data, whether or not to perform the target processing on the raw multimedia data based on the processing result for each to-be-processed multimedia data, where the second timestamp information indicates the time point when the processing result is generated.

In one embodiment, the first determining module is further configured to: mark each frame of the to-be-processed multimedia data using the first timestamp information of the raw multimedia data; mark a processing result of each frame of the to-be-processed multimedia data using second timestamp information; if it is determined, based on the second timestamp information and the first timestamp information, that the processing time length of a first multimedia data frame is not greater than a first threshold, perform the target processing on the raw multimedia data based on the processing result of the first multimedia data frame; and if it is determined, based on the second timestamp and the first timestamp information, that the processing time length of the first multimedia data frame is greater than the first threshold, discard the processing result of the first multimedia data frame.

Optionally, the first processing module includes at least one of the following: a first screening sub-module configured to identify at least one target data frame set from the raw multimedia data based on target requirement information, and take the at least one target data frame set as the at least one to-be-processed multimedia data, where there is at least a temporal correlation between data frames within each of the at least one target data frame set; a first sampling submodule configured to downsample target data frames of the raw multimedia data based on the target requirement information to obtain the at least one to-be-processed multimedia data, where the number of the target data frames is not greater than a total number of data frames in the raw multimedia data, and a resolution of each target data frame is lower than a resolution of a corresponding data frame in the raw multimedia data; or a second sampling submodule configured to perform target content sampling on the raw multimedia data based on target requirement information to obtain at least one target data frame set, and take the at least one target data frame set as the at least one to-be-processed multimedia data, where there is at least a content-related relationship between data frames within each target data frame set.

Optionally, the device also includes an information acquisition module for obtaining target requirement information, where the information acquisition module includes at least one of the following: a first acquisition sub-module configured to obtain the target requirement information based on information input by a target user acting on an input component of an electronic device; a second acquisition sub-module configured to obtain the target requirement information based on interaction data between the electronic device and a receiving terminal of the target multimedia data; a third acquisition sub-module configured to obtain the target requirement information based on application scenario information of the target multimedia data; or a fourth acquisition sub-module configured to obtain the target requirement information based on configuration information of the receiving terminal of the target multimedia data.

Optionally, the second processing module is further configured to determine a processing algorithm corresponding to each to-be-processed multimedia data based on the target requirement information; perform a parallel processing on each to-be-processed multimedia data based on the corresponding processing algorithm to obtain at least one processing result; and process the at least one processing result into processing parameters for the raw multimedia data.

Further, the third processing module is further configured to perform a target processing on the raw multimedia data based on the processing parameters corresponding to each processing result to obtain the target multimedia data, where the target processing includes at least one of the following: cropping, content replacement, annotation, scaling, parameter adjustment, special effects processing, encoding, or rendering.

In one embodiment, the device further includes at least one of the following: an update module, configured to update at least one processing algorithm based on changing information of the target requirement information; a first execution module configured to perform a corresponding first processing by using at least one electronic device in the processing system, where the processing system includes a plurality of electronic devices capable of executing the multimedia data processing method; a second executing module configured to perform a corresponding second processing with a corresponding processing algorithm by using at least one electronic device in the processing system, where the processing system includes a plurality of electronic devices capable of executing the multimedia data processing method.

It is to be noted that, for the specific implementation of each module and sub-module in the disclosed embodiments, reference may be made to the corresponding content in the foregoing descriptions and will not be described in detail here.

In another embodiment of the present disclosure, a readable storage medium is also provided, on which a computer program is stored. When the computer program is executed by a processor, each step of the multimedia data processing methods described in any of the above embodiments is implemented.

Figure 4:
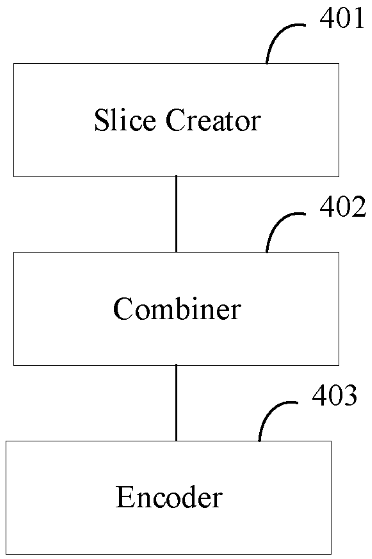
FIG. 4 is a schematic structural diagram of an electronic device, according to an embodiment of the present disclosure.

In another embodiment of the present disclosure, an electronic device is also provided. Referring to FIG. 4, the electronic device may include a slice creator 401 configured to perform a first processing on raw multimedia data based on target requirement information to obtain at least one to-be-processed multimedia data, where a data volume of each to-be-processed multimedia data is smaller than a data volume of the raw multimedia data; a combiner 402 configured to combine a processing result for each to-be-processed multimedia data obtained by performing a second processing on a corresponding to-be-processed multimedia data by using at least one processing algorithm, where the at least one processing algorithm is related to the target requirement information; and an encoder 403 configured to perform a target processing on the raw multimedia data based on the processing result for each to-be-processed multimedia data to obtain target multimedia data.

Further, the electronic device also includes a timeline synchronizer configured to obtain the first timestamp information of the raw multimedia data, and use the first timestamp information to align the to-be-processed multimedia data, the processing results, and the corresponding data frames of the raw multimedia data.

It is to be noted that in the disclosed embodiments, the implementation process of the slice creator, combiner, encoder, timeline synchronizer, and other components, or the specific implementation of the sub-steps of each component may refer to the corresponding content in the previous descriptions, details of which are not provided herein.

Each embodiment in this specification is described in a progressive manner. Each embodiment focuses on its difference from other embodiments. The same and similar parts between the various embodiments may be referred to each other. As for a device disclosed in the embodiments, since the device corresponds to a method disclosed in the embodiments, the description is relatively simple. For relevant details, refer to the description in the method section.

Those skilled in the art may further realize that the units and algorithm steps of each example described in connection with the embodiments disclosed herein may be implemented by electronic hardware, computer software, or a combination thereof. In order to thoroughly illustrate the interchangeability between hardware and software, in the above descriptions, the composition and steps of each example have been generally described according to functions. Whether these functions are performed in hardware or software depends on the specific application and design constraints of the technical solution. A person skilled in the art may implement the described functionalities using different methods for each specific application, but such implementations should not be considered beyond the scope of the present disclosure.

The steps of the methods or algorithms described in conjunction with the embodiments disclosed herein may be implemented directly in hardware, in software modules executed by a processor, or in a combination thereof. Software modules may be located in random access memory (RAM), memory, read-only memory (ROM), electrically programmable ROM, electrically erasable programmable ROM, registers, hard disks, removable disks, CD-ROMs, or any other known form of storage media in the field of storage technology.

The above description of the disclosed embodiments enables those skilled in the art to implement or use the present disclosure. Various modifications to these embodiments will be readily apparent to those skilled in the art, and the generic principles defined herein may be practiced in other embodiments without departing from the spirit or scope of the present disclosure. Accordingly, the present disclosure is not limited to the embodiments shown herein but is to be accorded the widest scope consistent with the principles and novel features disclosed herein.

What is claimed is:

1. A multimedia data processing method, comprising:

performing a first processing on raw multimedia data based on target requirement information to obtain at least one to-be-processed multimedia data, wherein a data volume of each to-be-processed multimedia data is smaller than a data volume of the raw multimedia data;

performing a second processing on a corresponding to-be-processed multimedia data by using at least one processing algorithm to obtain a processing result for each to-be-processed multimedia data, wherein the at least one processing algorithm is related to the target requirement information;

determining an availability of the processing result for each to-be-processed multimedia data based on timestamp information, and determining, based on the availability of the processing result for each to-be-processed multimedia data, whether or not to perform a target processing on the raw multimedia data based on the processing result; and in response to determining, based on the availability of the processing result for each to-be-processed multimedia data, to perform the target processing on the raw multimedia data, performing the target processing on the raw multimedia data based on the processing result for each to-be-processed multimedia data to obtain target multimedia data.

2. The method of claim 1, wherein the timestamp information is first timestamp information, the method further comprising:

obtaining second timestamp information of the raw multimedia data, and using the second timestamp information to align each to-be-processed multimedia data, the processing result for each to-be-processed multimedia data, and a corresponding data frame of the raw multimedia data.

3. The method of claim 1, wherein;

the timestamp information is first time stamp information; and determining the availability of the processing result based on the timestamp information comprises:

marking each frame of the to-be-processed multimedia data using second timestamp information of the raw multimedia data;

marking a processing result of each frame of the to-be-processed multimedia data using the first timestamp information;

in response to determining, based on the second timestamp information and the first timestamp information, that a processing time length of a first multimedia data frame is not greater than a first threshold, performing the target processing on the raw multimedia data based on a processing result of the first multimedia data frame; and in response to determining, based on the second timestamp information and the first timestamp information, that the processing time length of the first multimedia data frame is greater than the first threshold, discarding the processing result of the first multimedia data frame.

4. The method according to claim 1, wherein performing the first processing on the raw multimedia data based on the target requirement information comprises:

identifying at least one target data frame set from the raw multimedia data based on the target requirement information, and take the at least one target data frame set as the at least one to-be-processed multimedia data, wherein there is at least a temporal correlation between data frames within each of the at least one target data frame set.

5. The method according to claim 1, wherein performing the first processing on the raw multimedia data based on the target requirement information comprises:

performing a downsampling processing on target data frames of the raw multimedia data based on the target requirement information, to obtain the at least one to-be-processed multimedia data, wherein the number of target data frames is not greater than a total number of data frames of the raw multimedia data, and a resolution of each target data frame is lower than a resolution of a corresponding data frame in the raw multimedia data.

6. The method according to claim 1, wherein performing the first processing on the raw multimedia data based on the target requirement information comprises:

performing a target content sampling on the raw multimedia data based on the target requirement information, to obtain at least one target data frame set, and taking the at least one target data frame set as the at least one to-be-processed multimedia data, wherein there is at least a content correlation between data frames within each of the at least one target data frame set.

7. The method according to claim 1, further comprising obtaining the target requirement information.

8. The method according to claim 7, wherein obtaining the target requirement information comprises:

obtaining the target requirement information based on information input by a target user acting on an input component of an electronic device.

9. The method according to claim 7, wherein obtaining the target requirement information comprises:

obtaining the target requirement information based on interaction data between an electronic device and a receiving terminal of the target multimedia data.

10. The method according to claim 7, wherein obtaining the target requirement information comprises:

obtaining the target requirement information based on application scenario information of the target multimedia data.

11. The method according to claim 7, wherein obtaining the target requirement information comprises:

obtaining the target requirement information based on configuration information of a receiving terminal of the target multimedia data.

12. The method of claim 1, wherein performing the second processing on a corresponding to-be-processed multimedia data by using the at least one processing algorithm comprises:

determining a processing algorithm corresponding to each to-be-processed multimedia data based on the target requirement information;

performing a parallel processing on each to-be-processed multimedia data based on the corresponding processing algorithm to obtain at least one processing result; and processing the at least one processing result into processing parameters for the raw multimedia data.

13. The method according to claim 12, wherein performing the target processing of the raw multimedia data based on the processing result for each to-be-processed multimedia data comprises:

performing the target processing on the raw multimedia data based on the processing parameters corresponding to each processing result to obtain the target multimedia data.

14. The method according to claim 13, wherein the target processing includes at least one of the following:

cropping, content replacement, annotation, scaling, parameter adjustment, special effects processing, encoding, or rendering.

15. The method of claim 1, further comprising:

updating the at least one processing algorithm based on changing information of the target requirement information.

16. The method of claim 1, further comprising:

executing a corresponding first processing by at least one electronic device in a processing system, the processing system including a plurality of electronic devices capable of executing the multimedia data processing method.

17. The method of claim 1, further comprising:

executing a corresponding second processing using a corresponding processing algorithm by at least one electronic device in a processing system, the processing system including a plurality of electronic devices capable of executing the multimedia data processing method.

18. A multimedia data processing device, comprising:

a processor; and a memory coupled to the processor, the memory storing instructions that, when executed by the processor, cause the processor to:

perform a first processing on raw multimedia data based on target requirement information to obtain at least one to-be-processed multimedia, wherein a data volume of each to-be-processed multimedia data is smaller than a data volume of the raw multimedia data;

perform a second processing on a corresponding to-be-processed multimedia data by using at least one processing algorithm, and obtain a processing result for each to-be-processed multimedia data, wherein the at least one processing algorithm is related to the target requirement information;

determine an availability of the processing result for each to-be-processed multimedia data based on timestamp information, and determine, based on the availability of the processing result for each to-be-processed multimedia data, whether or not to perform a target processing on the raw multimedia data based on the processing result; and in response to determining, based on the availability of the processing result for each to-be-processed multimedia data, to perform the target processing on the raw multimedia data, perform the target processing on the raw multimedia data based on the processing result for each to-be-processed multimedia data to obtain target multimedia data.

19. The multimedia data processing device according to claim 18, wherein the timestamp information is first timestamp information, the instructions, when executed by the processor, further cause the processor to perform:

obtaining second timestamp information of the raw multimedia data, and using the second timestamp information to align each to-be-processed multimedia data, the processing result for each to-be-processed multimedia data, and a corresponding data frame of the raw multimedia data.

20. An electronic device, comprising:

a slice creator, configured to perform a first processing on raw multimedia data based on target requirement information to obtain at least one to-be-processed multimedia data, wherein a data volume of each to-be-processed multimedia data is smaller than a data volume of the raw multimedia data;

a combiner, configured to combine a processing result for each to-be-processed multimedia data obtained by performing a second processing on a corresponding to-be-processed multimedia data by using at least one processing algorithm, wherein the at least one processing algorithm is related to the target requirement information; and an encoder, configured to perform a target processing on the raw multimedia data based on the processing result for each to-be-processed multimedia data to obtain target multimedia data.

* * * * *